United States Patent
Cessna, Jr.

[11] 3,864,961
[45] Feb. 11, 1975

[54] MICRO-PARALLEL PLATE PLASTOMETER AND VISCOMETRY METHOD

[75] Inventor: Lawrence C. Cessna, Jr., Wilmington, Del.

[73] Assignee: Hercules Incorporated, Wilmington, Del.

[22] Filed: July 30, 1973

[21] Appl. No.: 383,756

[52] U.S. Cl............................ 73/54, 73/15.6, 73/94
[51] Int. Cl. ............................................ G01n 11/00
[58] Field of Search............ 73/54, 56, 57, 15.6, 94, 73/15.4

[56] References Cited
UNITED STATES PATENTS

| | | | |
|---|---|---|---|
| 2,637,198 | 5/1953 | Spangler et al. | 73/15.6 |
| 2,732,708 | 1/1956 | Linhorst | 73/15.6 |
| 2,754,675 | 7/1956 | More | 73/15.6 |
| 3,500,677 | 3/1970 | Webb | 73/57 |
| 3,706,221 | 12/1972 | Fletcher et al. | 73/57 |

FOREIGN PATENTS OR APPLICATIONS
169,848  6/1965  U.S.S.R. .............................. 73/56

*Primary Examiner*—Richard C. Queisser
*Assistant Examiner*—Joseph W. Roskos
*Attorney, Agent, or Firm*—James W. Peterson

[57] ABSTRACT

The invention is a device and a method for measuring viscosities of very small samples of resins, polymers or other viscous materials as a function of temperature or time of heating. The device comprises two coaxial cylindrical members held in alignment by a cage member such that the plastic sample of small mass may be held between the cylinders under constant pressure either at constant temperature or with a programmed temperature change. The pressure and temperature control and the continuous measurement of the change of thickness of the sample due to viscous flow are provided by a modern thermomechanical analyzer.

6 Claims, 2 Drawing Figures

PATENTED FEB 1 1 1975

3,864,961 ively complicated plastometer type device utilizing springs and aligned slide rods to apply pressure to a disc-shaped rubber sample, a constant temperature bath for isothermal temperature control, and a dial for indicating the change in specimen thickness with time. The method disclosed uses a point read out of change of sample thickness with time at a given temperature in the range of 200° to 300°F. as a comparative measure of the plastic deformability of a piece of rubbeer. It was not recognized that absolute viscosities of materials could be obtained by this technique, and it is not practical to calculate accurate viscosities from the data obtainable from this apparatus because the pressure applied to the sample and the change in thickness of the sample are not continuously recorded. It would not be practical with this apparatus to obtain accurate viscosity data or possible to follow rapid changes in specimen height or to perform non-isothermal tests where the flow characteristics of the specimen material are changing with temperature.

MICRO-PARALLEL PLATE PLASTOMETER AND VISCOMETRY METHOD

BACKGROUND OF THE INVENTION

It is important to know the effects of thermal history on the flow characteristics of polymers, resins and other viscous materials that will be fabricated into shapes or transported through flow processes requiring the application of heat and/or heat and pressure. The viscosity-temperature-time spectrum is the flow characteristic of most general value. Many methods of measuring viscosities of viscous temperature sensitive materials are now used. Among these are capillary viscometry, cone and plate or cup and bob rotational viscometry and comparative measurement techniques such as spiral flow and cup flow. These common techniques are suitable for the measurement of the viscosities of materials such as thermoplastics and pitches where the material properties do not change rapidly with time at a given temperature. They are, however, difficult to apply and interpret with thermosetting materials where the resin may be advancing (with increases of viscosities to infinite values) rapidly with time at a given temperature and with materials exhibiting phase changes with changes in temperature. The techniques described above are also difficult to apply if the viscosity range of interest is larger than one or two orders of magnitude.

One early type of melt viscosity test used with thermosetting materials was parallel plate plastometry described in detail by Dienes and Klemm in 1946 (Dienes and Klemm, J. App. Phys. 17, p. 458 (1946). With this technique a quantity of resin is placed between two coaxial discs and brought to equilibrium at a desired constant temperature. The viscosity of the material at that temperature can then be obtained from measurement of the rate of decrease of sample thickness between the discs for a given pressure on the upper disc. The usefulness of this technique was limited, however, by the large size and thermal inertia of the equipment and sample and the requirements of isothermal operation, which preclude detection of melting or other phase changes. Also, the rapid viscosity changes of thermosetting resins in the temperature ranges of interest for molding could not be accurately measured and continuous measurement of viscosity as a function of changing temperature could not be carried out. As with high pressure capillary viscometry essentially isothermal tests had to be carried out to insure thermal equilibrium within the sample. Thus, material properties could only be evaluated in temperature regimes where very slow changes in material properties were occurring. The size of the specimen required for capillary or conventional parallel plate plastometry and the requirement of a separate specimen and experiment for each temperature of interest reduces the usefulness of the technique in the evaluation of new resins where limited quantities are available.

U.S. Pat. No. 2,732,708 to Linhorst discloses a rela-

SUMMARY OF THE INVENTION

The purpose of the instant invention is to develop a device and method to obtain with a very small amount (less than about one gram) of material the viscosity-temperature behavior of almost any viscous substance in a very short period of time and to obtain the viscosity-time behavior of such a sample over any desired time period. To accomplish these purposes the instant invention provides a fixture for enclosing a small specimen between two coaxial cylinders held in alignment by a cage member, and a method of subjecting the specimen, using commercially available thermomechanical analytical equipment, to constant pressure either at constant temperaure or with a programmed temperature change. The change in specimen thickness with time is automatically recorded. These data are then used to calculate specimen viscosities as a function of time and/or temperature.

OBJECTS OF THE INVENTION

It is a primary object of the instant invention to provide a sample device and method for obtaining viscosity-temperature or viscosity-time behavior of almost any viscous substance rapidly with less than a gram of material.

It is a further object of the instant invention to provide a device and method which can be used to evaluate materials in a single test event which exhibit reactions or phase changes as a function of time or temperature resulting in changes of viscosity of several orders of magnitude.

It is yet another object of the instant invention to provide a device and method which can be used to continuously determine specimen viscosity curves as a function of thermal history, for example, viscosity-temperature curves for a given heating rate or viscosity-time curves for a given temperature.

DESCRIPTION OF THE PREFERRED EMBODIMENT

There has been a long felt need to develop a test which would allow the rapid determination of viscosities of materials, (such as plastics, pitches, rubbers, etc) as a function of arbitrary thermal histories such as constant heating rate, constant temperatures or other programmed temperature changes. A requirement for such a test is that it be capable of handling the solidification of material in the apparatus or follow the melting of a solid and, therefore continuous measurement of a very wide range of viscosities (e.g., 10 to $10^8$ poise).

Devices already exist in the form of modern precise thermomechanical analysis systems (for examples, the DuPont Thermomechanical Analyzer$^R$ and the Perkin-Elmer Precision Thermomechanical Analyzer) which can simultaneously control and continuously record the temperature and temperature history in a small sample chamber. Temperatures from −150°C. to +400°C. can be readily achieved and heating rates up to 40°C./min. or isothermal control may be employed. These types of devices also provide for accurate measurement and continuous recording of the vertical motion of a rod 10 supported by a specimen in the sample chamber 12. An electromechanical sensor 13 measures linear motion of the rod 10. The force imparted to a sample by this rod 10 can be varied by applying weights 11 of from about 0.1 to about 100 g. or higher to the top of the rod 10.

Figure 1:
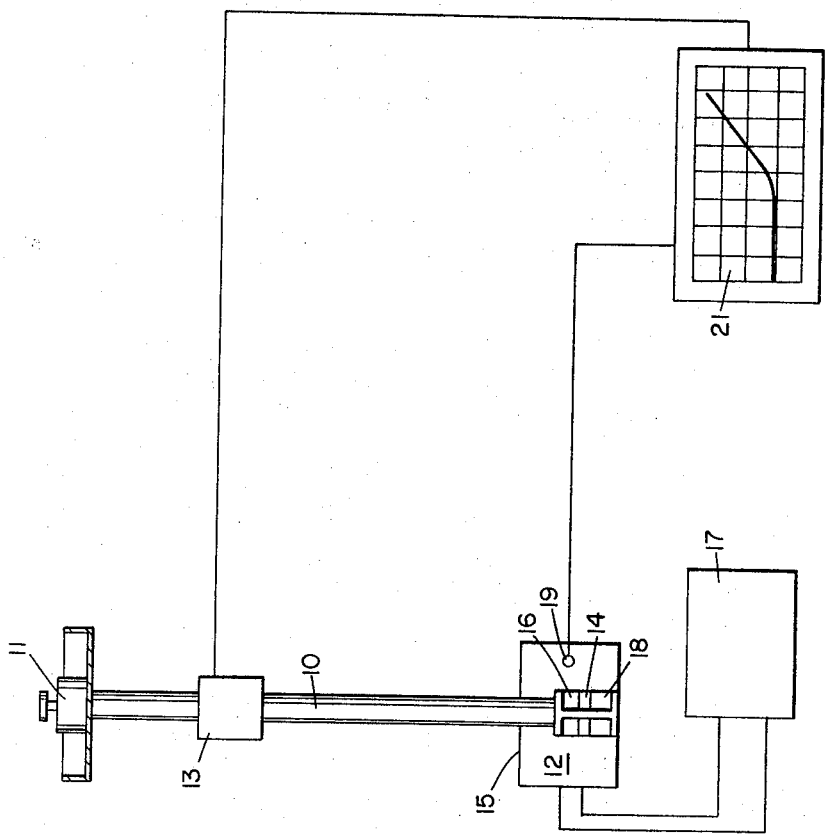
FIG. 1 shows a representative modern thermomechanical analyzer system utilizing the fixture of the instant invention.
Figure 2:
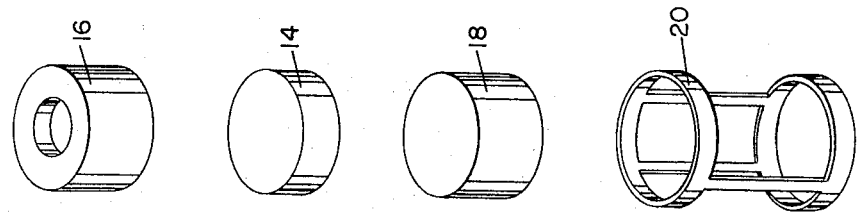
FIG. 2 shows an exploded perspective view of a microparallel plate plastometer fixture and test sample.

As seen in FIGS. 1 and 2, the instant invention utilizes a fixture which encloses a small specimen of material to be tested between the faces of two coaxial right circular cylinders 16 and 18. The axial alignment of the cylinders is provided by a cylindrical cage member 20. The fixture is positioned in the thermomechancial analyzer sample chamber 12 under the thrust rod 10 thereby allowing the thermomechanical analyzer to be used as a dynamic micro-parallel plate plastometer. Cylinder 16 may have a recessed portion to reduce its weight and to accommodate the end rod 10. Temperature is controlled by a temperature programmer-controller 17 and furnace 15 and monitored by thermocouple 19. Thermocouple 19 and sensor 13 are connected to a recording plotter 21 which thereby continuously follows the specimen thickness as a function of time, temperature and applied pressure. The specific dimensions of the specimen and the micro-plastometer attachment, and the constant axial forces applied to the thrust rod, are critical in the operation of the instant invention.

One specific embodiment of the fixture of the instant invention as seen in FIG. 2 comprising two 0.375 ± 0.0005 inch diameter coaxial right circular cylinders 16 and 18 of height 0.230 inch ± 0.01 inch. These coaxial cylinders are utilized with the instant method to test specimens 14 that are cold compacted, molded, cut or otherwise formed discs of material of 0.375 ± 0.002 inch in diameter by 0.030 inch or less in thickness. A cylindrical alignment cage 20 is utilized to insure coaxial alignment of the cylinders. The side openings of the cage allow essentially unrestricted outward flow of the specimen under pressure. The particular dimensions indicated are not meant to be exclusive. More general conditions are: sufficient rates of thermal equilibrium for tests a constant rates of temperature change up to 10°C./min. can be obtained with most organic specimens and all metallic specimens of thickness up to 0.075 inch thick. For accurate viscosity determination the specimen must have a diameter of at least 10 times its thickness and the specimen diameter must be equal to or less than 1/10 of 1% less than the diameter of the coaxial cylinder pieces. The ability to apply forces to the upper coaxial cylinder face of at least 50 grams for 0.375 inch diameter specimens and at least 300 grams for 0.75 inches diameter specimens must be available. To ensure smooth axial motion without binding of the coaxial cylinders in the alignment cage 20 the coaxial cylinders 16 and 18 should have an aspect ratio (height to diameter) of at least 0.5. The coefficients of thermal expansion of the materials making up the cylinders and cage shall be similar to avoid seizing with changes in temperature, and the cage must be of slightly larger inside diameter than the outside diameter of the coaxial cylinders. It would be within the scope of the invention to use only the top cylinder 16 and an alternate lower member (not shown) of different shape along with an alternate alignment means (not shown).

The force applied to the upper circular flat-surface member of the device should be sufficient to cause some flow of the sample at the temperature range employed in a test, but less than the amount which will cause more than a 75% decrease in the thickness of the sample. In general, pressures between 0.2 and 100 g./cm. are employed, the higher forces being used with more viscous samples.

A modern thermomechanical analyzer device will provide controlled and recorded temperatures of −150°C. to 600°C. and controlled and recorded constant heating rates of from 0°C./min. (isothermal) up to 40°C./min. It also provides the necessary resolution of the linear displacement of the weighted axial probe resting on the parallel plate fixture of <0.001 inch. By utilizing the instant fixture in concert with the method involving a modern thermomechanical analyzer a method is available for continuously determining viscosities of from about 10 to about $10^8$ poise with samples of only about 0.05 gram each. Because of the rapid thermal equilibrium possible with the small samples, and the accurate axial thrust rod measurement and temperature programming possible through the thermomechanical analyzer, the rate of thickness change of the specimen can be obtained as an instantaneous function of thermal history. It has been determined that the test specimen may be prevented from flowing radially in up to 15% of its circumferential area without interfering with the accuracy of the viscosity determinations. Thus, cope with posts whose combined thicknesses in the circumferential direction of the test specimen do not exceed 15 % of the circumference of the specimen may be employed.

The test procedure involves placing the specimen between the test fixture right circular cylinder faces, placing the test fixture specimen assembly under the thrust rod 10 in the thermomechanical analyzer test chamber 12, enclosing the test chamber within the temperature controlled furnace 15, selecting the thermal history of interest, placing the desired weight 11 on the axial thrust rod 10 and simultaneously recording the decrease in specimen thickness, elapsed time and temperature history on plotter 21.

These data are then worked up with a computer program based on an extension of the Dienes and Klemm analysis to produce a specimen viscosity curve as a function of thermal history, for example, viscosity-temperature curves for a given heating rate or viscosity-time curves for given temperatures. The calculations involve utilization of the instantaneous values of the rate of change of the sample height with time or temperature to determine the viscosity of the sample at that time or temperature using the equations developed by Dienes and klemm.

The instant device and procedure can be utilized to accurately measure the viscosity-thermal history relationship of materials such as thermoplastics such as polypropylene, polyethylene, polyesters; thermosets such as phenolics, polyesters; hard resins of the Vinsol type, pitches and tars and other viscous materials with viscosities in the range of 10 to $10^8$ poise in the temperature interval of −150°C. to 300°C.

As a result, the instant invention provides a device and method which can be accurately and quickly used to determine basic viscosity-thermal history relationships of plastics over large temperature and viscosity ranges. It is especially useful in the assessment of the advancement of thermosetting resins or the melting of thermoplastic materials because it can continuously follow and measure viscosity changes in the range of 10 to $10^8$ poise in a single dynamic test.

What I claim and desire to protect by Letters Patent is:

1. A method for obtaining data for calculating viscosities of very small samples of material comprising the steps of:
    a. providing a disc-shaped sample of less than one gram, said sample having a diameter to thickness ratio of at least 10:1;
    b. placing said sample between spaced coaxial cylinders having minimum diameters equal to the diameter of said specimen;
    c. compressing said sample under constant uniform pressure;
    d. heating said mample with a temperature schedule which consists of heating rates in the range of from 0°C./min. to 20°C./min.; and
    e. continuously recording the temperature and thickness of said sample with respect to time.

2. A method as in claim 1 wherein said heating step comprises maintaining said sample at a constant temperature with respect to time.

3. A method as in claim 1 wherein said heating step comprises a variable heating rate up to 20°C./min..

4. A micro-parallel plate plastometer for measuring very small samples of material, comprising:
    first and second spaced, coaxial cylinders, said space provided for insertion of a small sample of material;
    cage member surrounding said cylinders to maintain their coaxial alignment, said cage member having side openings to permit essentially unrestricted outward flow of a sample under pressure;
    pressure means connected to said coaxial cylinders to move said cylinders toward each other under constant uniform pressure;
    heating means operatively connected to said cylinders and cage member for heating a sample; and
    continuous recording means connected to said cylinders to record temperature of a sample and distance between said cylinders with respect to time.

5. A device as in claim 4 wherein said heating means maintains a sample at a constant temperature.

6. A device as in claim 4 wherein said heating means heats a sample at a variable heating rate up to 20°C/min..

* * * * *

PO-1050
(5/69)

UNITED STATES PATENT OFFICE
CERTIFICATE OF CORRECTION

Patent No. __3,864,961__ Dated __February 11, 1975__

Inventor(s) __Lawrence C. Cessna, Jr.__

It is certified that error appears in the above-identified patent and that said Letters Patent are hereby corrected as shown below:

Col. 1, line 67, " rubbeer " should read -- rubber --.

Col. 3, line 56, " a " should read -- at --.

Col. 4, line 41, delete " cope " and insert -- a cage --.

Col. 4, line 66, " klemm " should read -- Klemm --.

In the Claims, Col. 5, Claim 1, line 29, " mample " should read -- sample --.

Signed and sealed this 8th day of April 1975.

(SEAL)
Attest:

RUTH C. MASON
Attesting Officer

C. MARSHALL DANN
Commissioner of Patents
and Trademarks